May 12, 1925.
J. W. LIEDORFF
1,537,241
ATTACHMENT FOR TRACTORS
Original Filed Aug. 2, 1923   2 Sheets-Sheet 1
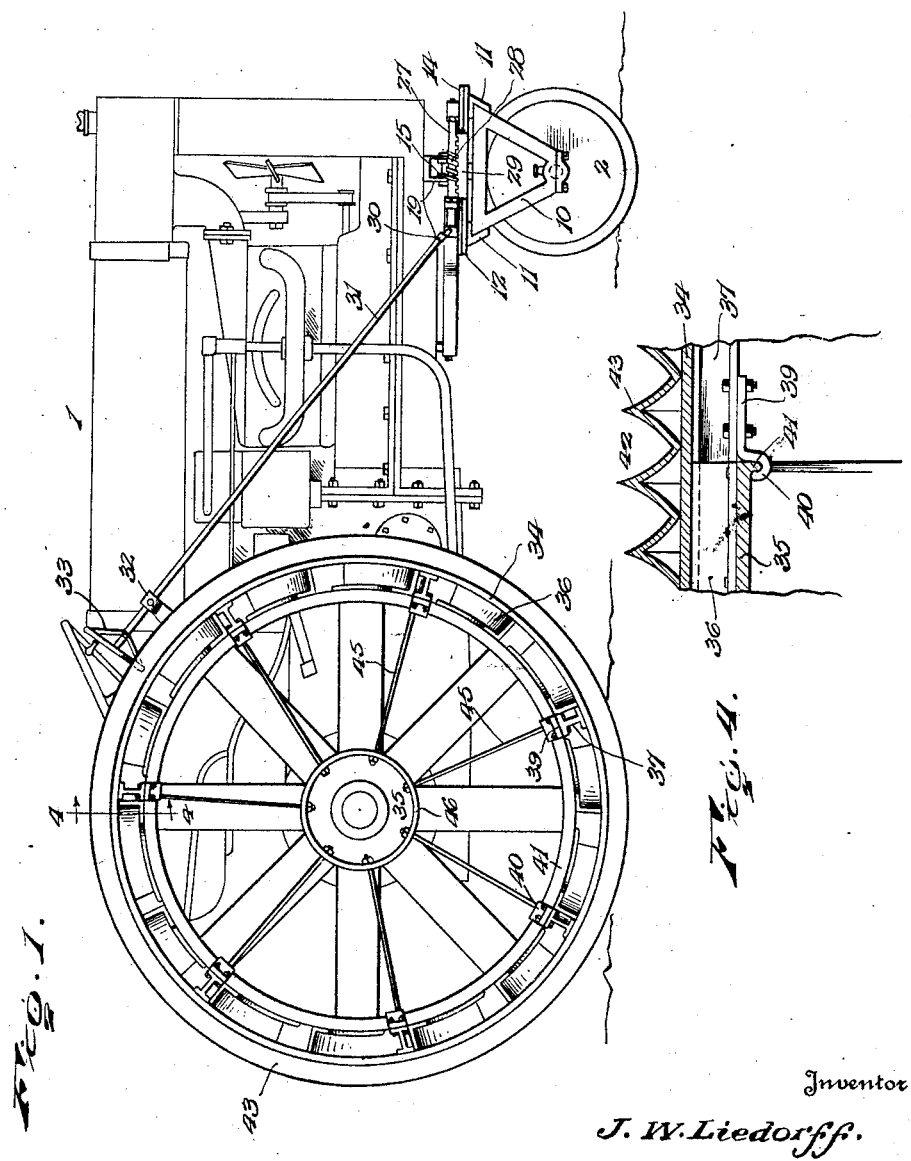
Inventor
J. W. Liedorff.
By
Lacy & Lacy, Attorneys May 12, 1925.　　　　　　　　　　　　　　　　　1,537,241
J. W. LIEDORFF
ATTACHMENT FOR TRACTORS
Original Filed Aug. 2, 1923　　2 Sheets-Sheet 2
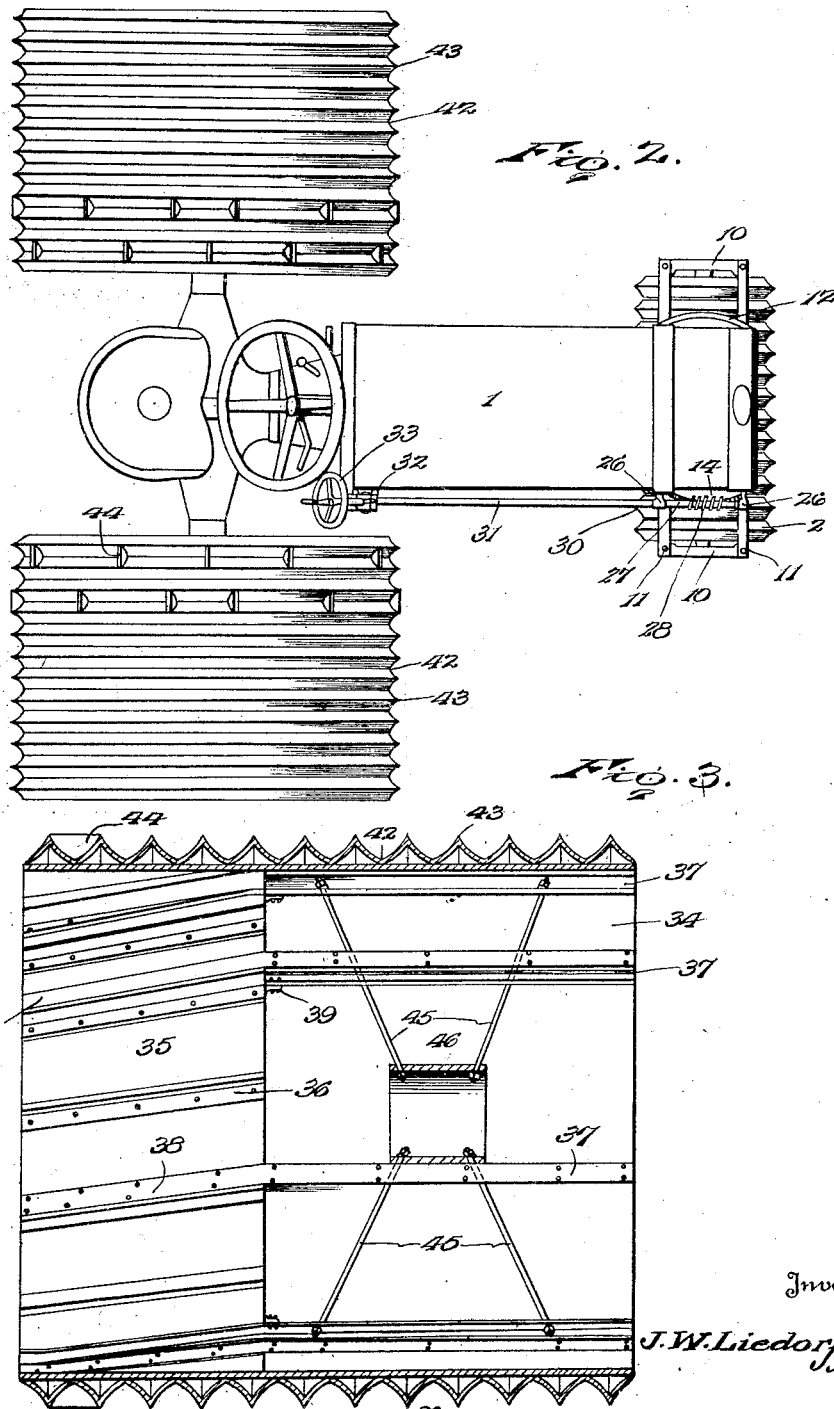
Inventor
J. W. Liedorff.
By Lacy & Lacy, Attorneys Patented May 12, 1925.

1,537,241

UNITED STATES PATENT OFFICE.

JAMES W. LIEDORFF, OF CALLAO, MISSOURI.

ATTACHMENT FOR TRACTORS.

Application filed August 2, 1923, Serial No. 655,300. Renewed March 30, 1925.

*To all whom it may concern:*

Be it known that I, JAMES W. LIEDORFF, a citizen of the United States, residing at Callao, in the county of Macon and State of Missouri, have invented certain new and useful Improvements in Attachments for Tractors, of which the following is a specification.

This application is a continuation in part of an application filed by me October 9, 1922, Serial No. 593,301.

This invention relates to agricultural implements and has for its object the provision of means whereby an ordinary farm tractor may be converted into a machine for cultivating and packing the soil. The invention seeks to provide means which may be readily attached to the tractor and serve as rolling supports for the same whereby, as the tractor is driven over the field, the surface of the soil will be pulverized and made firm to constitute a seed bed. The invention is illustrated in the accompanying drawings and will be hereinafter fully set forth.

In the drawings:

Figure 1 is a side elevation of a well-known farm tractor equipped with my improvements;

Fig. 2 is a plan view of the same;

Fig. 3 is a view, partly in plan and partly in longitudinal section, of a rear or driving wheel of the tractor having the present invention applied thereto, and Fig. 4 is a detail section on the line 4—4 of Fig. 1.

The tractor 1 may be of any well-known model and in itself forms no part of my invention. In carrying out my invention, I jack up the forward end of the tractor and substitute for the steering wheels ordinarily attached thereto a ground-treating instrumentality comprising a plurality of rollers 2 having their peripheries forming ridges. The rollers are mounted in and extend between triangular brackets or end frames 10 and the two end frames are connected by frame bars 11 having the proper cross sectional outline to fit closely to the upper corners of the end frames. A firm and strong structure is thus produced so that the rollers will be held together and may rotate freely as the machine is driven over the field. Upon the frame bars 11 at the centers thereof, I secure a turntable 12 and resting on the turntable 12 is an upper ring or annulus 14 which has a truss 15 formed upon one diameter of the same. A vertical pivot bolt is fitted vertically through the truss 15 and the center of the turntable and through the side webs of the truss a horizontal pivot bolt is fitted, the said bolt being also extended through lugs 19 which depend from the body of the tractor and normally furnish means for attaching the support of the tractor steering wheels. Upon the member 14, I secure the laterally projecting bearing arms or brackets 26 and in the said arms or brackets I journal a shaft 27 having a worm 28 thereon meshing with a worm gear or rack 29 formed on the adjacent edge of the turntable 12. Connected by a universal joint 30 to the rear end of the shaft 27 is an operating steering shaft 31 which extends upwardly and rearwardly from the said shaft 27 and has its upper rear portion journaled in a bracket 32 upon the body of the tractor, a hand wheel 33 being provided upon the rear extremity of the said steering shaft. It will be readily understood that rotation of the shaft 31 will be transmitted directly to the shaft 27 and thence to the worm 28 so that the rack or gear 29 will be caused to move forwardly or rearwardly and, consequently, a turning movement will be imparted to the gang of rollers so that it will assume an angular position relative to the body of the tractor and the machine caused thereby to follow any desired course.

After the gang of rollers 2 has been secured in position under the forward end of the tractor in the described manner and by the described means, the rear end of the tractor is jacked up and cylindrical shells 34 are secured about the rear driving wheels 35 of the tractor. The inside diameter of each shell 34 is such that the shell may be easily fitted about the tractor wheel and about the traction cleats 36 ordinarily provided upon the peripheries of said wheels, and to the inner circumferential surface of each shell, I secure a plurality of beams or I-shaped bars 37 which extend across the shell in lines parallel with the axis of the same, as will be readily understood upon reference to Figs. 1 and 3. These beams serve to brace the shells so that they will not collapse under the rough usage and the strains to which they are naturally subjected and their inner end portions, or those portions nearer the tractor when the shells are in place, are bent laterally so that they will lie parallel with the cleats 36, as shown clearly in Fig. 3. The beams 37 are provided in such numbers that the bent or deflected end 38 of each beam will be disposed between two tractor cleats 36 and adjacent one of said cleats while the alternate cleats will be free or without an I-beam adjacent thereto. To the surface of each bracing beam 37 remote from the shell 34 I secure a clip plate 39 having a hooked terminal 40 adapted to engage over the flange or rib 41 at the edge of the tractor wheel 35, as shown clearly in Fig. 4, and these clips may be secured at various points along the beams so that the shell 34 will entirely house the tractor wheel or may permit more or less of the inner end of the wheel to remain uncovered according to the work which is to be done, the nature of the soil and other controlling circumstances. Of course, when a portion of the tractor wheel is to be left uncovered, the clips will be secured to the laterally deflected portions of the I-beams or braces and a lesser length of the deflected portion of the beams will be secured to the rims of the tractor wheels. It will, of course, be understood that the bracing beams are secured rigidly to the respective shells by bolts or rivets inserted through the outer flanges of the beams and the shells and the deflected portions of the beams will be secured rigidly to the tractor wheels by bolts or rivets inserted through the inner flanges of the beams and the rims or treads of the wheels. Upon the exterior of each shell 34, I secure an outer shell which is corrugated, as shown at 42, so that each shell is provided with a plurality of annular ridges 43 corresponding to the tapered annular edges of the front rollers 2. Within the troughs or depressions between the ridges 43 at the inner ends of the shells are secured or formed transverse blocks or teeth 44 which constitute spading blades, and these spading blades may be provided in any desired number and in any desired relation. Ordinarily, the spading teeth or blades will be provided in the trough nearest the inner end of the shell and in the third trough, counting from the inner end of the shell, but they may be provided throughout the entire surface of the shell if so desired.

To further brace the structure, brace rods 45 are secured to the beams 37 and extend inwardly therefrom to a central sleeve or connecting ring 46 which is alined axially with the hub of the wheel 35. The braces are secured to the beams 37 adjacent the ends of the portions thereof which lie beyond the wheels and they converge inwardly toward the sleeve or ring 46 so that the shell will be held taut to resist buckling. While the shell 34 lends strength to the structure, it may be omitted and the beams 37 secured directly to the corrugated shell 42.

The shells 34 having been secured in proper position upon the rear wheels of the tractor in the described manner, the rear portion of the tractor is lowered so that the said shells will rest upon the ground and the tractor is then operated in the usual manner so as to travel over the field. In its travel, the tapered ridges presented by the front gang of rollers and the shells upon the rear wheels will cut into the surface of the soil and will divide and turn aside the same so that it will be effectually loosened, any roots which may be present being cut and clods or lumps of dirt being thoroughly pulverized. At the same time the troughs presented by the rollers and shells will serve to pack the turned over portions of the soil so that the surface will be made firm and moisture which may be in the soil below the surface will be conserved. As shown in Fig. 2, the rear shells are secured upon the tractor wheels in such position that the tractor wheels are entirely enclosed and the inner ends of the shells are in alinement with the ends of the front gang so that the entire surface of the field will be acted upon by the several ridges and troughs. When the several elements are thus arranged, the machine will be adapted to roll the ground solid and the tractor may at the same time pull a harrow, a cultivator, or a planter in rear of the rear shells so that the work of preparing the ground and planting the crop may be simultaneously performed. If it be desired to cultivate growing corn, the rear shells are set so as to permit a portion, usually about four inches, of the inner ends of the rear tractor wheels to project from the inner ends of the shells and the machine is then driven along the rows of corn, the front gang passing between two rows of corn which will pass between the sides of the tractor and the inner ends of the shells. It will be, of course, readily understood that the bracing beams which are secured to the inner sides of the shells will support the tractor wheels above the surface of the ground in this operation so that the traction cleats will not break or otherwise damage the young plants. If the rear shells be entirely removed when the ground is dry or when it is desired to plow a ground in which stalks may be standing, a plow or gang of plows may be coupled to the tractor so that, if the tractor be then driven over the field, the front gang of rollers will make a dust mulch ahead of the plows or will cut up the standing stalks and produce a good rich mulch ahead of the plows.

My invention provides mechanism which may be produced at a reasonable cost and readily applied to any tractor at a slight expense and without requiring skilled labor. Where my devices are provided, the farmer is enabled to readily and easily perform whatever operations may be needed to bring his soil into proper condition for the planting of a crop or cultivating a young crop without being required to provide a large number of separate implements. The spading blades upon the rear shells not only serve to break up and spade the soil but also furnish the desired traction so that the tractor with my improvements applied thereto may be driven over the field exactly as it is ordinarily operated and without requiring any change in the construction or arrangement of any of its operating parts. The mounting for the front gang of rollers permits the rollers to follow any inequalities in the surface of the ground without disturbing the level of the tractor and also permits the said front gang to be shifted angularly relative to the tractor so that the steering of the tractor will be easily accomplished while at the same time the gang will be firmly held in a set angular relation to the tractor.

Having thus described the invention, what is claimed as new is:

1. Mechanism for the purposes set forth comprising a cylindrical shell having circumferentially extending corrugations on its external surface, and means for securing said shell around the rear wheel of a tractor.

2. Mechanism for the purposes set forth comprising a cylindrical shell adapted to encircle the driving wheel of a tractor and the cleats on said wheel, braces secured rigidly to the inner surface of the shell and having deflected portions adapted to be secured upon the outer surface of the tractor driving wheel, and clips secured to the said bracing members and adapted to engage over the flange at the edge of the tractor driving wheel rim.

3. Mechanism for the purpose set forth comprising a cylindrical shell adapted to encircle the traction wheel of a tractor and having a corrugated outer surface, and bracing members secured upon the inner surface of the shell and having deflected portions adapted to bear upon the outer surface of the traction wheel and be secured thereto.

4. Mechanism for the purpose set forth comprising a cylindrical shell adapted to fit about the traction wheel of a tractor and about the cleats on said wheel, bracing elements secured upon the inner surface of the shell and adapted to be secured upon the outer surface of the traction wheel between the traction cleats thereof, the said shell having a transverse corrugated outer surface, and spading blades secured within some of the corrugations of said surface.

5. Mechanism for the purpose set forth comprising a corrugated shell, means for securing said shell about a traction wheel, and blades within some of the corrugations of the shell.

6. Mechanism for the purpose set forth comprising a corrugated shell adapted to encircle a traction wheel, and bracing beams secured longitudinally upon the inner circumference of the shell and adapted to be secured upon the outer circumference of the traction wheel.

7. Mechanism for the purpose set forth comprising a corrugated shell, means for securing one end portion of the shell about a traction wheel, a central ring within the other end portion of the shell, and braces extending between said ring and the shell.

In testimony whereof I affix my signature.

JAMES W. LIEDORFF. [L. S.]